(12) United States Patent
Choi et al.

(10) Patent No.: US 12,374,174 B2
(45) Date of Patent: Jul. 29, 2025

(54) ARTIFICIAL NEURAL NETWORK FOR PREDICTING VEHICLE STATUS

(71) Applicant: INFOCAR CO., LTD., Daejeon (KR)

(72) Inventors: Geo Seok Choi, Seoul (KR); Moon Kyu Choi, Seoul (KR); Geon Ho Pyo, Uijeongbu-si (KR); Gyu Hyeon Lee, Daejeon (KR)

(73) Assignee: INFOCAR CO., LTD., Daejeon (KR)

( * ) Notice: Subject to any disclaimer, the term of this patent is extended or adjusted under 35 U.S.C. 154(b) by 0 days.

(21) Appl. No.: 17/466,407

(22) PCT Filed: Aug. 12, 2021

(86) PCT No.: PCT/KR2021/010722
§ 371 (c)(1),
(2) Date: Sep. 3, 2021

(87) PCT Pub. No.: WO2022/114453
PCT Pub. Date: Jun. 2, 2022

(65) Prior Publication Data
US 2023/0282037 A1  Sep. 7, 2023

(30) Foreign Application Priority Data
Nov. 30, 2020 (KR) .......... 10-2020-0164543

(51) Int. Cl.
*G07C 5/08* (2006.01)
*G06N 3/08* (2023.01)

(52) U.S. Cl.
CPC ............ *G07C 5/0808* (2013.01); *G06N 3/08* (2013.01); *G07C 5/0841* (2013.01)

(58) Field of Classification Search
CPC ....... G07C 5/0808; G07C 5/0841; G06N 3/08
See application file for complete search history.

(56) References Cited

U.S. PATENT DOCUMENTS 11,676,014 B1 *  6/2023  Hallac .................... G06Q 10/20
                                                  706/12
2016/0314632 A1 * 10/2016  Lu .......................... G07C 5/085
(Continued)

FOREIGN PATENT DOCUMENTS

KR    10-2017-0076131       7/2017

*Primary Examiner* — Dale W Hilgendorf
*Assistant Examiner* — Hana Lee
(74) *Attorney, Agent, or Firm* — PnK IP LLC

(57) ABSTRACT

A method and system for causing an artificial neural network to learn using driving record data and diagnostic trouble data that can be collected while a vehicle travels, and predicting troubles of the vehicle in advance using the same. The method includes the steps of: collecting driving record time series data indicating a vehicle state or a driving state of a collection target vehicle during a predetermined measurement period, by a computing system; collecting diagnostic trouble codes (DTCs) generated while the collection target vehicle travels during the measurement period, by the computing system; generating a learning data set on the basis of the driving record time series data and the diagnostic trouble codes of the collection target vehicle collected during the measurement period, by the computing system; and causing an artificial neural network to learn on the basis of the generated learning data set, by the computing system.

11 Claims, 12 Drawing Sheets

(56) References Cited

U.S. PATENT DOCUMENTS

| | | | |
|---|---|---|---|
| 2020/0202643 A1* | 6/2020 | He | G06N 5/01 |
| 2021/0016786 A1* | 1/2021 | Griffiths | B60W 50/14 |
| 2021/0110480 A1* | 4/2021 | Kwak | G07C 5/008 |
| 2021/0150827 A1* | 5/2021 | Abramov | G07C 5/0808 |
| 2022/0067667 A1* | 3/2022 | Mahipal | G06N 3/006 |

* cited by examiner

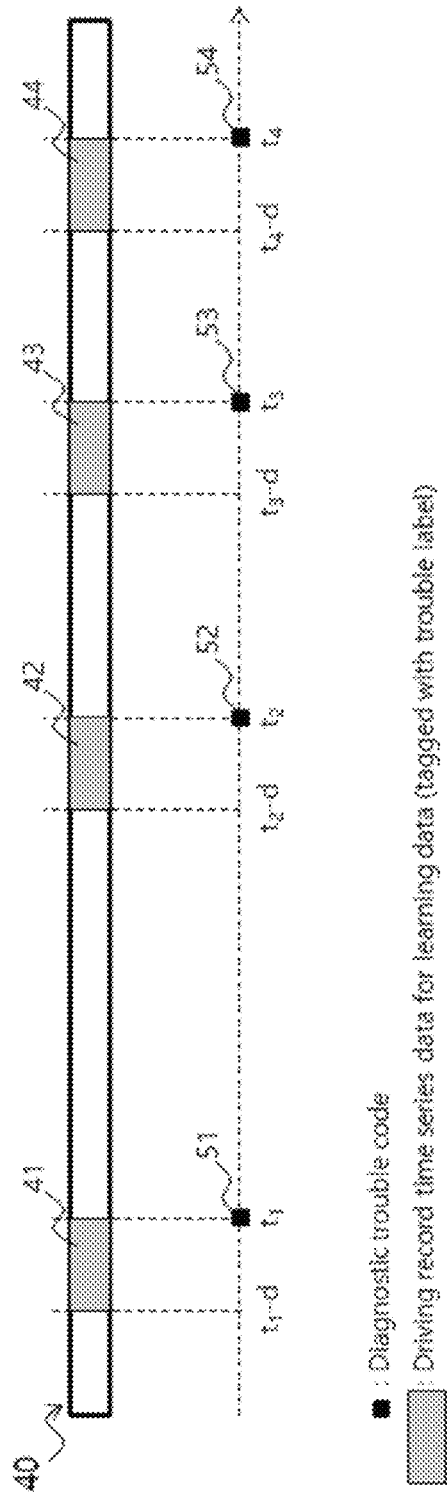

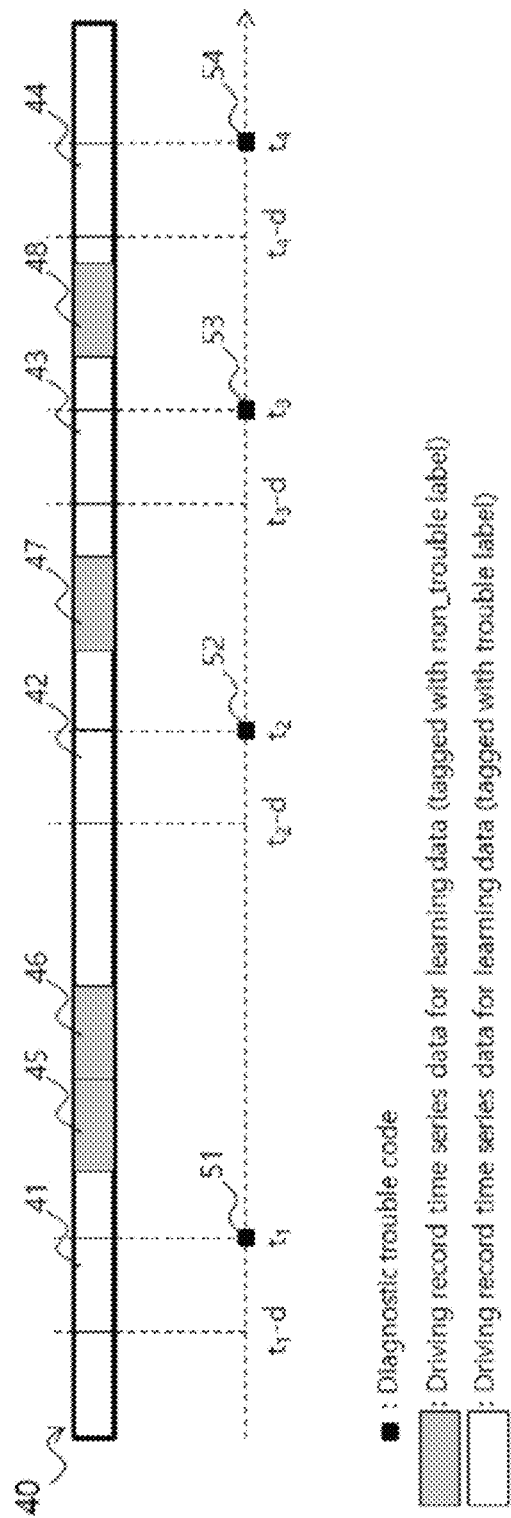

(a)            (b)            (c)

ARTIFICIAL NEURAL NETWORK FOR PREDICTING VEHICLE STATUS

TECHNICAL FIELD

The present invention relates to an artificial neural network learning method for predicting whether a vehicle has a trouble, a method of determining whether a vehicle has a trouble, and a computing system for performing the same. More specifically, the present invention provides a method and system for learning an artificial neural network using driving record data and diagnostic trouble data that can be collected while a vehicle travels, and predicting troubles of the vehicle in advance using the same.

BACKGROUND ART

Generally, data output from an on-board diagnostic device (OBD), which diagnoses the state of a vehicle, is inspected to identify troubles of the vehicle. The OBD is a device that diagnoses the state of a vehicle by itself and outputs a result thereof. Vehicles produced recently are equipped with sensors for various measurements and controls, and these devices are controlled by an Electronic Control Unit (ECU). The ECU precisely controls core functions of the engine, such as setting of ignition timing, fuel injection, variable valve timing, idling, threshold values and the like, and with development of vehicle and computer performance, the ECU is also responsible for controlling all parts of a vehicle, such as a driving system, a braking system, a steering system and the like, in addition to automatic transmission control. The electronic diagnosis system like this has been developed continuously and established recently as a standardized diagnostic system that is called as On-Board Diagnostic version 2 (OBD2). The OBD may collect various types of information, and the information includes remaining vehicle battery level, battery voltage information, tire pressure, used fuel ratio (cost), engine trouble notification, fuel consumption, driving speed/distance/time, coolant temperature, fuel cut/lock-up notification, fuel efficiency, RPM, engine oil temperature, remaining fuel, gear ratio, and the like.

Conventionally, although information on the state of a vehicle output from an OBD or the like is compared with a specific value to diagnose whether the vehicle has a trouble, this method is limited in that whether a vehicle has a trouble may be identified only after the trouble has occurred in the vehicle.

On the other hand, owing to advancement in artificial neural network techniques including deep learning, there have been various attempts of using artificial neural networks to solve various problems that are difficult to solve with general algorithms. Accordingly, there is a growing demand for solving the problem of predicting troubles of a vehicle in advance through a technique related to deep learning or artificial neural networks.

PRIOR ART DOCUMENTS

Patent Documents

Korean Patent Registration No. 10-2017-0076131

DISCLOSURE OF INVENTION

Technical Problem

Therefore, the present invention has been made in view of the above problems, and it is an object of the present invention to provide a method and system capable of learning an artificial neural network using driving record data and diagnostic trouble data that can be collected while a vehicle travels, and predicting troubles of the vehicle in advance using the same.

Technical Solution

To accomplish the above object, according to one aspect of the present invention, there is provided an artificial neural network learning method comprising the steps of: (a) collecting driving record time series data indicating a vehicle state or a driving state of a collection target vehicle during a predetermined measurement period, by a computing system; (b) collecting diagnostic trouble codes (DTCs) generated while the collection target vehicle travels during the measurement period, by the computing system; (c) generating a learning data set on the basis of the driving record time series data and the diagnostic trouble codes of the collection target vehicle collected during the measurement period, by the computing system; and (d) learning an artificial neural network on the basis of the generated learning data set, by the computing system.

In an embodiment, the step of generating a learning data set on the basis of the driving record time series data and the diagnostic trouble code of the collection target vehicle collected during the measurement period by the computing system may include the steps of: extracting driving record time series data corresponding to a diagnostic trouble code for learning for each diagnostic trouble code for learning, which is at least a part of the diagnostic trouble code of the collection target vehicle collected during the measurement period, wherein the driving record time series data corresponding to a diagnostic trouble code for learning is a part corresponding to a predetermined period in the past starting from a time point of collecting the diagnostic trouble code for learning among the driving record time series data collected during the measurement period; and generating individual learning data to be included in the learning data set using the driving record time series data corresponding to a diagnostic trouble code for learning for each diagnostic trouble code for learning, wherein the individual learning data generated using the driving record time series data corresponding to a diagnostic trouble code for learning is tagged with a trouble label corresponding to the diagnostic trouble code for learning.

In an embodiment, the step of generating a learning data set on the basis of the driving record time series data and the diagnostic trouble code of the collection target vehicle collected during the measurement period by the computing system may further include the steps of: extracting at least part of non-trouble time series data excluding the driving record time series data respectively corresponding to the diagnostic trouble code for learning from the driving record time series data collected during the measurement period; and generating individual learning data to be included in the learning data set using the extracted at least part of non-trouble time series data, wherein the individual learning data generated using the extracted at least part of non-trouble time series data is tagged with a non-trouble label.

In an embodiment, the artificial neural network learning method may further comprise the step of performing steps (a) to (d) for each of a plurality of vehicles having vehicle characteristics the same as those of the collection target vehicle, wherein the vehicle characteristics may be at least one among a vehicle model, a vehicle year, and an engine type.

In an embodiment, the driving record time series data may include time series data of at least some among the speed, revolutions of engine per unit time, degree of stepping the pedal according to acceleration of the driver, opening degree of throttle valve according to acceleration of the driver, amount of fuel in the air, tire pressure and temperature, battery voltage, intake air pressure, driving distance, remaining fuel amount, engine temperature, coolant temperature, and angular velocity.

In an embodiment, the step of generating individual learning data to be included in the learning data set using the driving record time series data corresponding to a diagnostic trouble code for learning may include the step of generating a time series graph image using the driving record time series data corresponding to a diagnostic trouble code for learning.

In an embodiment, the driving record time series data may be configured of time series data of a plurality of individual elements, and the step of generating a time series graph image using the driving record time series data corresponding to a diagnostic trouble code for learning may include the steps of: generating a time series graph of a time series data of an individual element, for each of the time series data of a plurality of individual elements configuring the driving record time series data corresponding to a diagnostic trouble code for learning; and generating a synthesized data by synthesizing time series graphs of a plurality of individual elements configuring the individual learning data, wherein the step of learning an artificial neural network on the basis of the generated learning data set may include the step of learning the artificial neural network by inputting a synthesized data corresponding to each individual learning data included in the learning data set into the artificial neural network.

According to another aspect of the present invention, there is provided a method of predicting whether a vehicle has a trouble through an artificial neural network learned by the artificial neural network learning method described above, the prediction method comprising the steps of: collecting driving record time series data indicating a vehicle state or a driving state of a prediction target vehicle collected during a predetermined measurement period, by a computing system; and determining whether the prediction target vehicle has a trouble by the computing system on the basis of a prediction value predicted by the artificial neural network from the driving record time series data of the prediction target vehicle.

According to another aspect of the present invention, there is provided a computer-readable recording medium for storing a computer program for performing the method described above.

According to another aspect of the present invention, there is provided a computer program installed in an information processing device and stored in a computer-readable recording medium for performing the method described above.

According to another aspect of the present invention, there is provided a computing system comprising: a processor; and a memory for storing a computer program, wherein when the computer program is executed by the processor, the computer program controls the computing system to perform the method described above.

According to another aspect of the present invention, there is provided an artificial neural network learning system that performs learning of an artificial neural network for predicting whether a vehicle has a trouble, the system comprising: a collection module for collecting driving record time series data indicating a vehicle state or a driving state of a collection target vehicle during a predetermined measurement period, and collecting diagnostic trouble codes (DTC) generated while the collection target vehicle travels during the measurement period; a generation module for generating a learning data set on the basis of the driving record time series data and the diagnostic trouble codes of the collection target vehicle collected during the measurement period; and a learning module for learning the artificial neural network on the basis of the generated learning data set.

In an embodiment, the generation module may extract a driving record time series data corresponding to a diagnostic trouble code for learning for each diagnostic trouble code for learning, which is at least a part of the diagnostic trouble code of the collection target vehicle collected during the measurement period, and generate individual learning data to be included in the learning data set using the driving record time series data corresponding to a diagnostic trouble code for learning for each diagnostic trouble code for learning, wherein the driving record time series data corresponding to a diagnostic trouble code for learning may be a part corresponding to a predetermined period in the past starting from a time point of collecting the diagnostic trouble code for learning among the driving record time series data collected during the measurement period, and the individual learning data generated using the driving record time series data corresponding to a diagnostic trouble code for learning may be tagged with a trouble label corresponding to the diagnostic trouble code for learning.

In an embodiment, the generation module may extract at least part of non-trouble time series data excluding the driving record time series data respectively corresponding to the diagnostic trouble code for learning from the driving record time series data collected during the measurement period, and further generate individual learning data to be included in the learning data set using the extracted at least part of non-trouble time series data, wherein the individual learning data generated using the extracted at least part of non-trouble time series data may be tagged with a non-trouble label.

In an embodiment, the artificial neural network learning system may further learn the artificial neural network with driving record time series data collected from each of a plurality of vehicles having vehicle characteristics the same as those of the collection target vehicle, wherein the vehicle characteristics may be at least one among a vehicle model, a vehicle year, and an engine type.

In an embodiment, the generation module may generate a time series graph image using the driving record time series data corresponding to a diagnostic trouble code for learning in order to generate individual learning data to be included in the learning data set using the driving record time series data corresponding to a diagnostic trouble code for learning.

In an embodiment, the driving record time series data may be configured of time series data of a plurality of individual elements, and the generation module may generate a time series graph of a time series data of an individual element, for each of the time series data of a plurality of individual elements configuring the driving record time series data corresponding to a diagnostic trouble code for learning in order to generate a time series graph image using the driving record time series data corresponding to a diagnostic trouble code for learning, wherein the learning module may generate a synthesized image by synthesizing time series graphs of a plurality of individual elements configuring the individual learning data for each individual learning data included in the learning data set, and learn the artificial neural network by inputting the generated synthesized image into the artificial neural network.

According to another aspect of the present invention, there is provided a vehicle trouble prediction system for predicting whether a vehicle has a trouble through an artificial neural network trained by the artificial neural network learning method described above, the system comprising: a collection module for collecting driving record time series data indicating a vehicle state or a driving state of a prediction target vehicle collected during a predetermined measurement period; and a determination module for determining whether the prediction target vehicle has a trouble on the basis of a prediction value predicted by the artificial neural network from the driving record time series data of the prediction target vehicle.

Advantageous Effects

According to an embodiment of the present invention, it is possible to provide a method and system capable of learning an artificial neural network using driving record data and diagnostic trouble data that can be collected while a vehicle travels, and predicting troubles of the vehicle in advance using the same.

BRIEF DESCRIPTION OF THE DRAWINGS

In order to more fully understand the drawings cited in the detailed description of the present invention, a brief description of each drawing is provided.

FIGS. 4a to 4c are views showing an example of a process of extracting driving record time series data for learning.

BEST MODE FOR CARRYING OUT THE INVENTION

Figure 1:
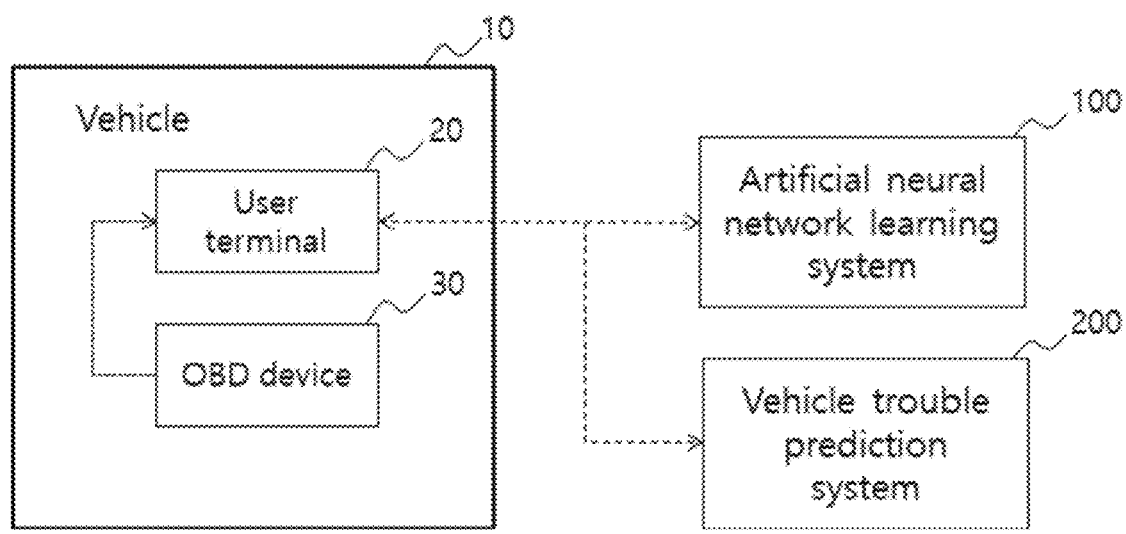
FIG. 1 is a view schematically showing an environment in which an artificial neural network learning method and a vehicle trouble prediction method according to the spirit of the present invention are performed.

As the present invention may apply various modifications and have various embodiments, specific embodiments will be illustrated in the drawings and described in detail in the detailed description. However, this is not intended to limit the present invention to any particular implementation appearance, and it should be understood to include all modifications, equivalents, and substitutes included in the spirit and scope of the present invention. In describing the present invention, when it is determined that detailed description of a related known technology may obscure the subject matter of the present invention, the detailed description will be omitted.

Although the terms such as first, second and the like may be used to describe various components, the components should not be limited by the terms. These terms are only used for the purpose of distinguishing one component from the other components.

The terms used in the present application are only used to describe specific embodiments, and are not intended to limit the present invention. Singular expressions include plural expressions unless the context clearly indicates otherwise.

In this specification, the terms such as "comprise" or "have" are intended to designate the presence of features, numbers, steps, actions, components, parts, or combinations thereof described in the specification, and it should be understood that they do not preclude the possibility of the presence or addition of one or more other features or numbers, steps, actions, components, parts, or combinations thereof.

In addition, in this specification, when any one component 'transmits' data to another component, this means that the component may directly transmit the data to another component, or may transmit the data to another component through at least one other component. On the contrary, when one component 'directly transmits' data to another component, it means that the data is transmitted from the component to another component without passing through the other components.

Hereinafter, the present invention will be described in detail focusing on the embodiments of the present invention with reference to the accompanying drawings. The same reference numerals in each drawing indicate the same members.

FIG. 1 is a view schematically showing an environment in which an artificial neural network learning method and a vehicle trouble prediction method according to the spirit of the present invention are performed.

Referring to FIG. 1, the artificial neural network learning method may be performed by an artificial neural network learning system 100 according to an embodiment of the present invention, and the vehicle trouble prediction method may be performed by a vehicle trouble prediction system 200 according to an embodiment of the present invention. The artificial neural network learning system 100 may learn an artificial neural network for determining whether a vehicle has a trouble, and the vehicle trouble prediction system 200 may use the learned artificial neural network to determine whether the vehicle has a trouble.

The artificial neural network learning system 100 and/or the vehicle trouble prediction system 200 may be a computing system, which is a data processing device having a computing ability for implementing the spirit of the present invention, and may include a computing device such as a personal computer, a portable terminal or the like, as well as a server, which is generally a data processing device that can be accessed by a client through a network. Although the artificial neural network learning system 100 and/or the vehicle trouble prediction system 200 may be implemented as any one physical device, those skilled in the art may easily infer that the artificial neural network learning system 100 and/or the vehicle trouble prediction system 200 according to the spirit of the present invention may be implemented by organically combining a plurality of physical devices as needed.

The artificial neural network learning system 100 and the vehicle trouble prediction system 200 may perform communication with a user terminal 20 possessed by a driver operating the vehicle 10, and transmit and receive various types of information, signals and/or data needed to implement the spirit of the present invention. For example, the artificial neural network learning system 100 and the vehicle trouble prediction system 200 may be connected to the user terminal 20 through Wi-Fi, a cellular network, and/or the Internet. Alternatively, according to embodiments, the artificial neural network learning system 100 and/or the vehicle trouble prediction system 200 may be implemented in a form included in the user terminal 20.

The user terminal 20 may be an information processing device having a network communication function. For example, the user terminal 20 may be a processing device including a desktop computer, a laptop computer, or a handheld device such as a cellular phone, a satellite phone, a wireless phone, a Session Initiation Protocol (SIP) station, a Wireless Local Loop (WLL) station, a smartphone, a tablet PC, a Personal Digital Assistant (PDA), and the like.

An on-board diagnostics (OBD) device 30 may be installed in the vehicle 20.

The ODB device 30 is a system that supports OBD/OBD-II, which is a diagnostic standard for confirming and controlling electric/electronic operating states of a vehicle, and may acquire various data indicating a vehicle state or a driving state from the engine control unit (ECU) of the vehicle 10 or various sensors mounted on the vehicle 10, and output the acquired data to the outside.

The artificial neural network learning system 100 and the vehicle trouble prediction system 200 may collect various data from the OBD device 30 or the like installed in the vehicle 10, as well as the user terminal 20 possessed by the driver of the vehicle 10. To this end, in one embodiment, the user terminal 20 may be connected to the OBD device 30 through a wired/wireless network as shown in FIG. 1 to acquire various information and/or data needed to implement the spirit of the present invention and transmit the acquired information and/or data to the safe driving assistance system 100.

According to embodiments, it goes without saying that the artificial neural network learning system 100 and the vehicle trouble prediction system 200 may be implemented to be connected to the OBD device 30 through a communication network to directly collect information without going through the user terminal 20.

The artificial neural network learning system 100 may learn the artificial neural network on the basis of driving record time series data indicating a vehicle state or a driving state of the vehicle 10, and the vehicle trouble prediction system 200 may predict whether the vehicle has a trouble in advance by applying the driving record time series data collected from the vehicle to be predicted (e.g., 10) to the artificial neural network learned in advance by the artificial neural network learning system 100.

In this specification, the time series data may mean a data in which observation values are arranged in a temporal order or data sequentially observed at regular time intervals.

On the other hand, the driving record time series data may include at least some of time series data of speed, the number of revolutions of engine per unit time (e.g., revolutions per minute (RPM)), degree of stepping the pedal according to acceleration of the driver (Accelerator Position Sensor (APS)), opening degree of throttle valve according to acceleration of the driver (Throttle Position Sensor (TPS)), amount of fuel in the air (Mass Air Flow (MAF)), tire pressure and temperature (Tire Pressure Monitoring System (TPMS)), battery voltage (BAT), intake air pressure (Manifold Absolute Pressure (MAP)), driving distance, remaining fuel amount, engine temperature, coolant temperature, and angular velocity.

Meanwhile, although FIG. 1 shows that the artificial neural network learning system 100 collects information from one vehicle 10 for convenience of explanation, in reality, the artificial neural network learning system 100 may collect data from a plurality of vehicles.

In this specification, the artificial neural network is a neural network artificially constructed on the basis of the operation principle of human neurons, which includes a multi-layer perceptron model, and may mean a set of information expressing a series of design items defining the artificial neural network.

In an embodiment, the artificial neural network may be a convolutional neural network or may include a convolutional neural network. As is well known, a convolutional neural network may include an input layer, a plurality of hidden layers, and an output layer. Each of the plurality of hidden layers may include a convolution layer and a pooling layer (or a sub-sampling layer). The convolutional neural network may be defined by a function, a filter, a stride, a weight factor, or the like for defining each of the layers. In addition, the output layer may be defined as a fully connected FeedForward layer. The design details of each layer constituting the convolutional neural network are widely known. For example, publicized functions may be used for each of a convolution function, a pooling function, and an activation function to define the number of layers to be included in the plurality of layers and define the plurality of layers, and separately defined functions may be used to implement the spirit of the present invention.

In an embodiment, the artificial neural network may perform binary classification or multiple classification according to embodiments. The artificial neural network may be a neural network for supervised learning or a neural network for unsupervised learning that may be learned with unlabeled data according to embodiments. For example, although the artificial neural network may be a model based on a generative adversarial network (GAN), the spirit of the present invention is not limited thereto.

Meanwhile, the learned artificial neural network may be stored in the vehicle trouble prediction system 200, and the vehicle trouble prediction system 200 may use the learned artificial neural network to determine whether a predetermined trouble prediction target vehicle (e.g., 10) has a trouble. Although FIG. 1 shows that a vehicle for collecting learning data and a vehicle that becomes a trouble prediction target are the same for convenience, it is natural that the vehicle for collecting learning data and the vehicle that becomes a trouble prediction target may be different in an actual implementation.

According to embodiments, the artificial neural network learning system 100 and the vehicle trouble prediction system 200 may be implemented to be separate from each other or may be implemented as a single system. Alternatively, the artificial neural network learning system 100 and/or the vehicle trouble prediction system 200 may be implemented in the form of a subsystem of a predetermined parent system.

Hereinafter, the artificial neural network learning system 100 and the artificial neural network learning method will be described first, and the difference between the vehicle trouble prediction system 200 and the vehicle trouble prediction method will be described mainly focusing the difference.

Figure 2:
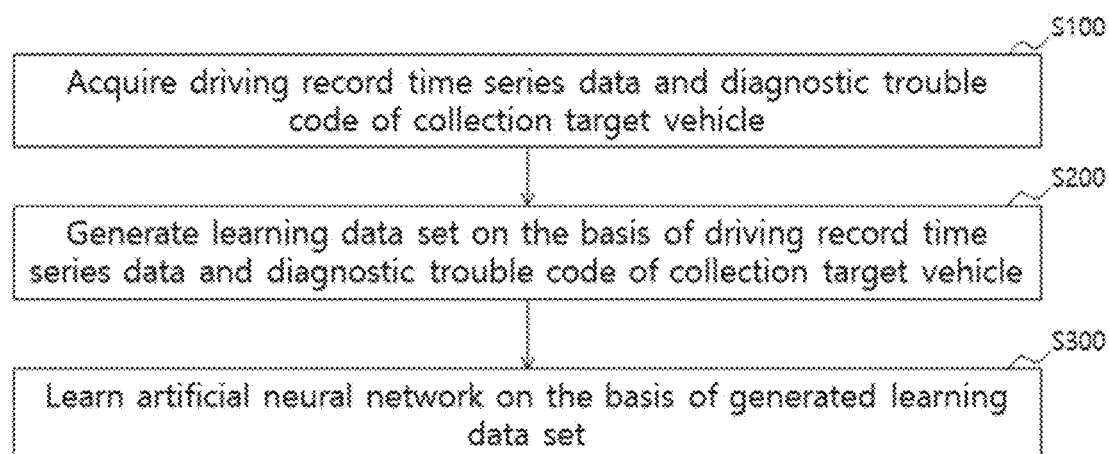
FIG. 2 is a flowchart illustrating an artificial neural network learning method according to an embodiment of the present invention.

FIG. 2 is a flowchart illustrating an artificial neural network learning method according to an embodiment of the present invention.

Referring to FIG. 2, the artificial neural network learning system 100 may collect driving record time series data indicating a vehicle state or a driving state of a collection target vehicle (e.g., 10) during a predetermined measurement period (S100). For example, the artificial neural network learning system 100 may receive the driving record time series data from the user terminal 20 of the driver of the vehicle 10 or the OBD device 30.

In addition, the artificial neural network learning system 100 may further collect Diagnostic Trouble Codes (DTCs) generated while the collection target vehicle (e.g., 10) travels during the measurement period (S100). For example, the artificial neural network learning system 100 may receive the DTCs from the user terminal 20 of the driver of the vehicle 10 or the OBD device 30.

The measurement period may be a continuous period or a discontinuous period. For example, the measurement period may be several periods in which the vehicle 10 actually travels.

The DTC is a code provided by the ECU of the vehicle 10, and the DTC generated in the vehicle is expressed to inform the user to know the trouble or problem of the actuator, power supply, exhaust gas or the like detected by various sensors of the vehicle for each code, and the user (or a mechanic) collects and uses the DTC to fix the problem of the vehicle. The DTC is generally expressed to include 1 letter and 4 numerals like P1234, and has a meaning as follows.

Character at the first place (letter): System classification (P: Driving device, B: Body, C: Chassis)

Character at the second place (numeral): Standard classification (0: SAE standard, 1: Manufacturer standard)

Character at the third place (numeral): Auxiliary system classification (1: Air/Fuel, 2: Fuel injection, 3: Ignition system, 4: Exhaust system, 5: Vehicle speed control, 6: Electronic circuit, 7/8: Transmission)

Characters at the fourth and fifth places (numerals): Values used or assigned to be different for each vehicle or vehicle model According to embodiments, the artificial neural network learning system 100 may use the whole or only part of the collected DTC for the purpose of learning. For example, the artificial neural network learning system 100 may use only the first letter and the second numeral of the DTC, which inform the trouble state of each auxiliary system of the vehicle, for the purpose of learning.

Since the DTC, which informs trouble of a vehicle, is classified by the type of the trouble, different learning data may be used for each DTC. That is, accuracy of DTC prediction is improved by analyzing driving record data and refining vehicle data that generates a specific DTC. The table below shows an example of using different learning data for each DTC.

TABLE 1

| DTC | Trouble type | Elements configuring learning data (examples) |
| --- | --- | --- |
| P0100 | Air/fuel system of driving device | Speed, RPM, APS, TPS, MAF |
| P0200 | Fuel injection of driving device | Speed, RPM, TPS, MAF, MAP |
| P0300 | Ignition system of driving device | Speed, RPM, TPS, MAF, MAP |
| P0400 | Exhaust system of driving device | Speed, RPM, APS, TPS, TPMS, BAT |
| P0500 | Vehicle speed control of driving device | Speed, RPM, APS, TPS, TPMS |
| P0600 | Electronic circuit of driving device | Speed, RPM, TPMS, BAT, MAP |
| P0700 | Transmission of driving device | Speed, RPM, APS, TPS, TPMS |

Meanwhile, the artificial neural network learning system 100 may generate a learning data set on the basis of the driving record time series data and the DTC of the collection target vehicle collected during the measurement period (S200). The learning data set may include a plurality of individual learning data.

Thereafter, the artificial neural network learning system 100 may learn an artificial neural network on the basis of the learning data set (S300). More specifically, the artificial neural network learning system 100 may learn the artificial neural network by inputting each individual learning data included in the learning data set into the artificial neural network.

The artificial neural network learning system 100 may generate individual learning data to be included in the learning data set by extracting some of the driving record time series data of the collection target vehicle collected during the measurement period, and this will be described in more detail with reference to FIG. 3.

Figure 3:
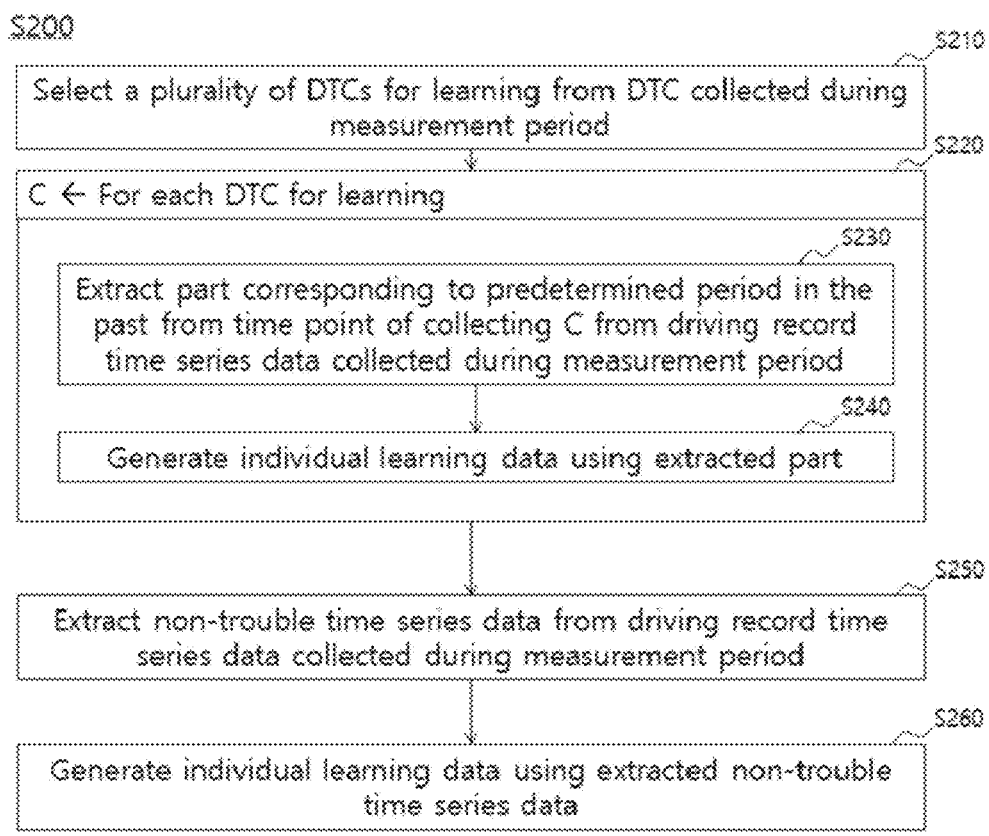
FIG. 3 is a flowchart illustrating an example of step S200 of FIG. 2 in more detail.

FIG. 3 is a flowchart illustrating an example of step S200 of FIG. 2 in more detail.

Referring to FIG. 3, the artificial neural network learning system 100 may select a plurality of diagnostic trouble codes for learning, which are at least a part of the entire diagnostic trouble code collected during the measurement period (S220). The diagnostic trouble code for learning may be a diagnostic trouble code that satisfies a predetermined condition. In an embodiment, the diagnostic trouble code for learning may be a code in which a character at a specific place has a specific value. For example, the diagnostic trouble code for learning may be a code having letter P at the first place or a code having letter P at the first place and numeral 2 at the third place. As such, the artificial neural network learning system 100 may select a diagnostic trouble code for learning that meets a preset condition from the entire diagnostic trouble code collected during the measurement period.

The artificial neural network learning system 100 may perform steps S230 and S240 for each diagnostic trouble code C for learning, which is at least a part of the diagnostic trouble code of the collection target vehicle collected during the measurement period (S220).

At step S230, the artificial neural network learning system 100 may extract a driving record time series data corresponding to the diagnostic trouble code C for learning, and in this case, the driving record time series data corresponding to the diagnostic trouble code for learning may be a part corresponding to a predetermined period in the past starting from the time point of collecting the diagnostic trouble code for learning among the driving record time series data collected during the measurement period (S230).

FIG. 4a is a view showing an example of a process of extracting driving record time series data corresponding to a diagnostic trouble code C for learning.

Referring to FIG. 4a, when diagnostic trouble codes 51, 52, 53 and 54 for learning are generated at specific time points t1, t2, t3 and t4, the artificial neural network learning system 100 may extract a driving record time series data 41 between t1-d, i.e., a time point in the past from time point t1 as far as a predetermined period d, and t1, a driving record time series data 42 between t2-d, i.e., a time point in the past from time point t2 as far as a predetermined period d, and t2, a driving record time series data 43 between t3-d, i.e., a time point in the past from time point t3 as far as a predetermined period d, and t3, a driving record time series data 44 between td-d, i.e., a time point in the past from time point t4 as far as a predetermined period d, and t4, from the entire driving record time series data 40 collected during the measurement period.

On the other hand, when a trouble occurs in a specific part of the vehicle and a diagnostic trouble code corresponding to the trouble is generated, the diagnostic trouble code may be continuously generated thereafter until the trouble is resolved. Accordingly, in an embodiment, when a specific diagnostic trouble code is continuously generated, the artificial neural network learning system 100 may extract only a time series data corresponding to the initial diagnostic trouble code and use the time series data to generate individual learning data, and an example of which is shown in FIG. 4b.

Figure 4B:
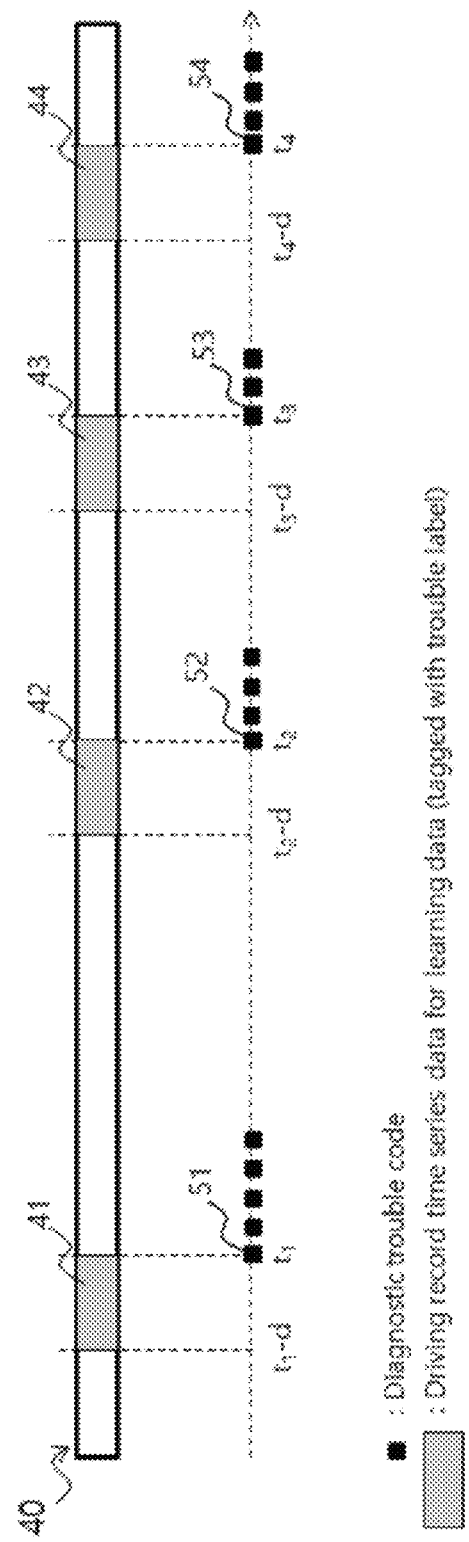

Referring to FIG. 4b, when the diagnostic trouble codes 51, 52, 53 and 54 for learning are initially generated at specific time points t1, t2, t3 and t4, although the same diagnostic trouble codes are continuously generated after the corresponding time points, the artificial neural network learning system 100 may extract only the driving record time series data 41, 42, 43 and 44 corresponding to the diagnostic trouble codes 51, 52, 53 and 54 generated at specific time points t1, t2, t3 and t4. In this case, that a specific diagnostic trouble code is initially generated may mean that a corresponding diagnostic trouble code has not been generated before or a sufficient time has passed since the time when the diagnostic trouble code is generated last.

Meanwhile, according to embodiments, the artificial neural network learning system 100 may extract time series data at a predetermined time point before and after the generation of the diagnostic trouble code for learning, instead of a predetermined time in the past when the diagnostic trouble code for learning is generated.

Referring to FIG. 3 again, at step S240, the artificial neural network learning system 100 may generate individual learning data to be included in the learning data set using a driving record time series data corresponding to the diagnostic trouble code C for learning (S240).

In this case, the individual learning data generated using the driving record time series data corresponding to a diagnostic trouble code for learning may be tagged with a trouble label corresponding to the diagnostic trouble code for learning. When the artificial neural network learning system 100 is a system that learns whether each auxiliary system of the vehicle has a trouble, since the trouble state of each auxiliary system of the vehicle is expressed by the letter at the first place and the numeral at the third place of the DTC, the individual learning data may be tagged with any one of the following trouble labels that can be expressed by the letter at the first place and the numeral at the third place.

P1 to P8: Trouble labels that may be generated in the auxiliary system of the driving unit B1 to B8: Trouble labels that may be generated in the auxiliary system of the body C1 to C8: Trouble labels that may be generated in the auxiliary system of the chassis (1: Air/Fuel, 2: Fuel injection, 3: Ignition system, 4: Exhaust system, 5: Vehicle speed control, 6: Electronic circuit, 7/8: Transmission)

When the artificial neural network learning system 100 is a system for learning whether an auxiliary system of the driving device has a trouble, the trouble label may be any one of P1 to P8.

Meanwhile, in an embodiment, the artificial neural network learning system 100 may further extract at least part of non-trouble time series data excluding the driving record time series data respectively corresponding to the diagnostic trouble code for learning from the driving record time series data collected during the measurement period (S250), and may further generate individual learning data to be included in the learning data set using the extracted at least part of non-trouble time series data (S260). In this case, the individual learning data generated using the at least part of non-trouble time series data may be tagged with a non-trouble label.

FIG. 4c is a view showing an example of a process of extracting non-trouble time series data.

Referring to FIG. 4c, the artificial neural network learning system 100 may extract a part (e.g., 45, 46, 47 or 48) corresponding to period d as a non-trouble time series data from the portions excluding the driving record time series data 41, 42, 43 and 44 respectively corresponding to the diagnostic trouble code for learning previously extracted from the entire driving record time series data 40 collected during the measurement period.

On the other hand, although the artificial neural network learning system 100 may use the extracted time series data (driving record time series data and/or non-trouble time series data corresponding to the diagnostic trouble code for learning) as it is as individual learning data without additional processing, in many embodiments, the artificial neural network learning system 100 may generate individual data by converting the extracted time series data into a format or a form suitable for being input into the input layer of the artificial neural network.

In one embodiment, when the artificial neural network to be learned by the artificial neural network learning system 100 is a model that receives data of a matrix form like an image, the artificial neural network learning system 100 may generate individual learning data of an image form. That is, the individual learning data generated at step S240 and/or step S260 of FIG. 3 may be in the form of an image.

More specifically, in an embodiment, the artificial neural network learning system 100 may generate a time series graph image using a driving record time series data and/or a non-trouble time series data corresponding to the diagnostic trouble code for learning, and in this case, the individual learning data corresponding to each time series data may be a time series graph image.

Figure 5:
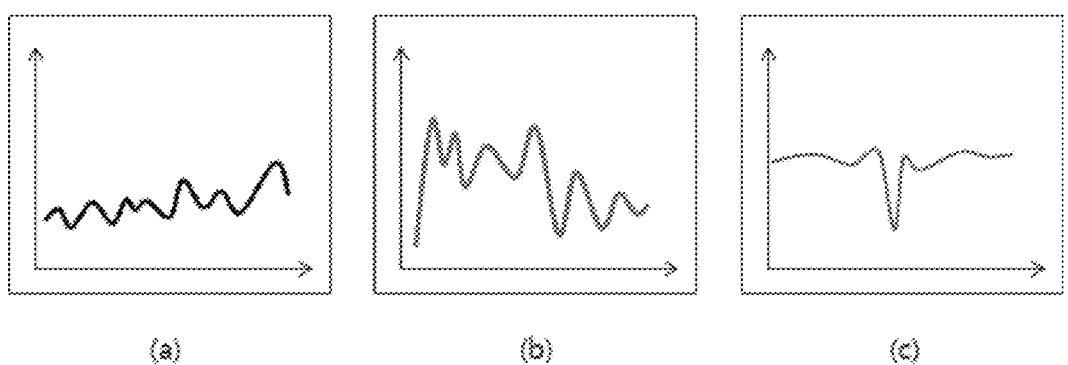
FIG. 5 presents views respectively showing an example of a time series graph image.

FIG. 5 presents views respectively showing an example of a time series graph image. FIG. 5 presents views respectively showing a graph expressing an observation value of a specific element configuring driving record data on the y-axis and observation time thereof on the x-axis as an image.

On the other hand, when the driving record time series data is configured of time series data of several elements, the artificial neural network learning system 100 may generate only a time series graph image corresponding to the time series data of one specific element and use it as individual learning data.

Alternatively, according to embodiments, the artificial neural network learning system 100 may generate a time series graph image of a time series data of each of various elements configuring the driving record time series data, and synthesize the generated time series graph image of each of the various elements to use the synthesized graph image as individual learning data. In this case, the size of the generated time series graph image of each of the various elements may be the same.

There may be various methods of synthesizing time series graph images of various elements configuring driving record time series data.

Figure 6:
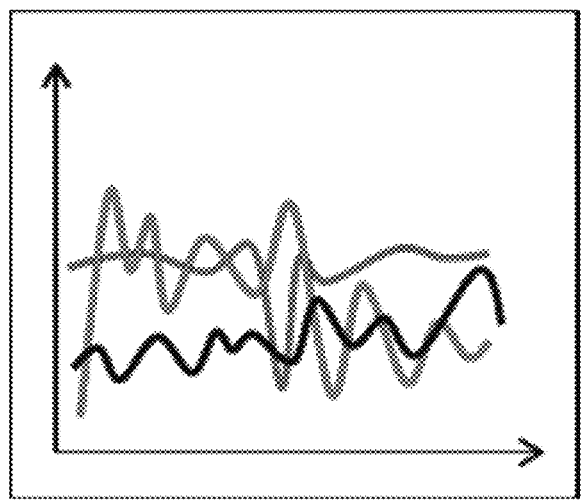
FIG. 6 is a view showing an example of a result of synthesizing (a) to (c) of FIG. 5.

In an embodiment, the artificial neural network learning system 100 may synthesize a time series graph image in a way of configuring one image using pixels configuring the time series graph image of each of various elements configuring the driving record time series data, and an example of which is shown in FIG. 6. FIG. 6 is a view showing a result of synthesizing (a) to (c) of FIG. 5.

Figure 7:
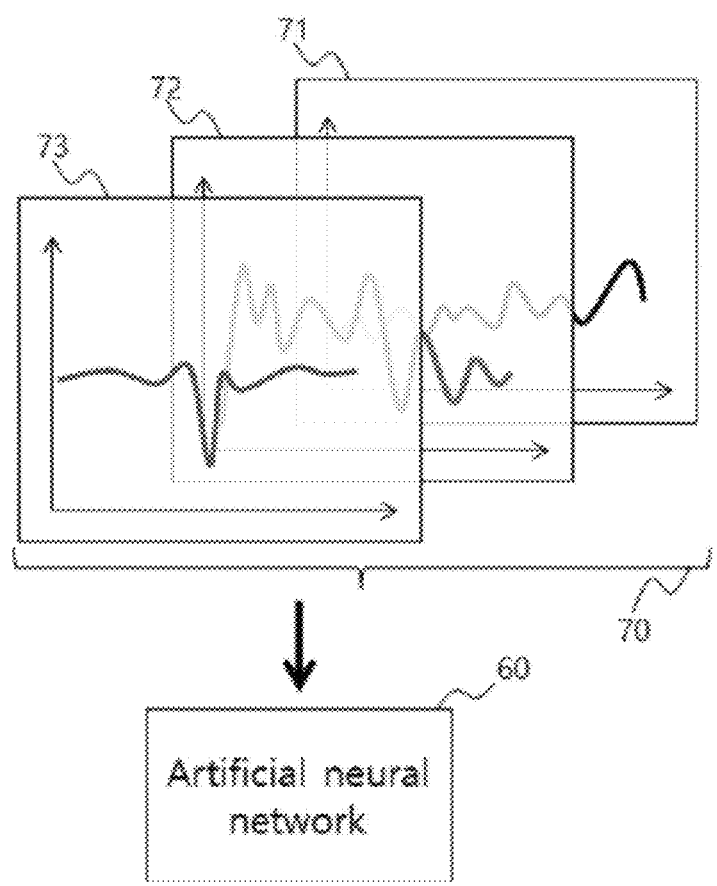
FIG. 7 is a view showing an example of generating a synthesized data by configuring (a) to (c) of FIG. 5 as different channels.

In another embodiment, the artificial neural network learning system 100 may configure time series graph images of various elements configuring the driving record time series data as different channels. For example, when a time series graph image of each of three elements is generated, the artificial neural network learning system 100 may configure a first channel of the synthesized data with the time series graph image of a first element, a second channel of the synthesized data with the time series graph image of a second element, and a third channel of the synthesized data with the time series graph image of a third element. FIG. 7 is a view showing a result of synthesizing (a) to (c) of FIG. 5 way.

Referring to FIG. 7, the time series graph image of the first element (FIG. 5(a)) configures the first channel 71 of the synthesized data 70, the time series graph image of the second element (FIG. 5(b)) configures the second channel 72 of the synthesized data 70, and the time series graph image of the third element (FIG. 5(c)) configures the third channel 73 of the synthesized data 70, and the artificial neural network learning system 100 may learn the artificial neural network 60 by inputting the synthesized data 70 configured of the three channels into the artificial neural network 60.

On the other hand, the individual elements configuring the driving record time series data may be at least some among the speed, revolutions of engine per unit time, degree of stepping the pedal according to acceleration of the driver, opening degree of throttle valve according to acceleration of the driver, amount of fuel in the air, tire pressure and temperature, battery voltage, intake air pressure, driving distance, remaining fuel amount, engine temperature, coolant temperature, and angular velocity.

What has been described above with reference to FIGS. 2 to 7 relates to details of generating learning data using data collected from one vehicle and inputting it into the artificial neural network 60 to learn, and the artificial neural network learning system 100 may collect time series data targeting several vehicles and repeat the process of FIG. 2 a plurality of times in order to learn the artificial neural network 60. That is, the artificial neural network learning system 100 may acquire driving record time series data and diagnostic trouble codes from various collection target vehicles, and learn the artificial neural network 60 with a learning data set generated on the basis of the data and codes.

The diagnostic trouble data and the driving record data generated in a vehicle may vary according to the type of a vehicle or the driving style of a driver. That is, when data for learning the artificial neural network is configured in consideration of the type of a vehicle or the driving style of a driver, accuracy of the vehicle trouble prediction system can be improved. For example, when diagnostic trouble data and driving record data of the same ID and vehicle identification number are used for learning the artificial neural network to predict trouble of a vehicle that is almost driven by only an individual, accuracy of predicting a vehicle trouble can be improved. In addition, when trouble of a vehicle commonly applied to a specific vehicle model is predicted, accuracy of predicting the trouble of the vehicle can be improved by collecting diagnostic trouble data and driving record data for each characteristic of the vehicle, such as a vehicle model, a year, or an engine type, and using the data as data for learning the artificial neural network.

For this reason, the artificial neural network learning system 100 according to an embodiment may learn the artificial neural network 60 by acquiring driving record time series data and diagnostic trouble codes from a plurality of collection target vehicles having the same vehicle characteristics, and the vehicle characteristics may be at least one among a vehicle model, a vehicle year, and an engine type. For example, the artificial neural network learning system 100 may acquire the driving record time series data and the diagnostic trouble codes from several vehicles of the same vehicle model or acquire the driving record time series data and the diagnostic trouble codes from several vehicles having the same engine type, according to the purpose of learning the artificial neural network 60.

Figure 8:
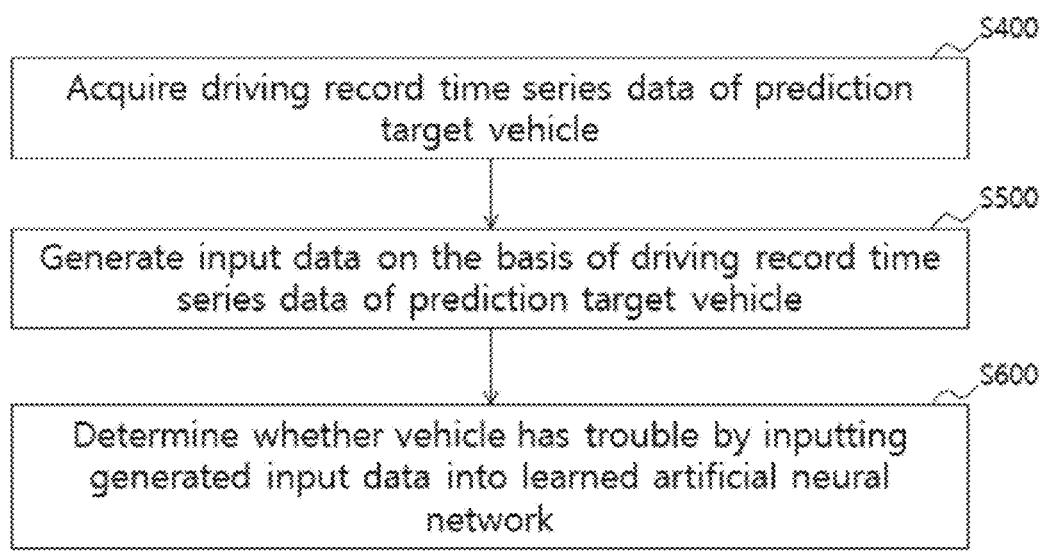
FIG. 8 is a flowchart illustrating an example of a vehicle trouble prediction method according to an embodiment of the present invention.

FIG. 8 is a flowchart illustrating an example of a vehicle trouble prediction method according to an embodiment of the present invention. The vehicle trouble prediction method according to FIG. 8 may be performed by the vehicle trouble prediction system 200, and the vehicle trouble prediction system 200 may store the artificial neural network 60 learned by the artificial neural network learning system 100.

Referring to FIG. 8, the vehicle trouble prediction system 200 may collect driving record time series data indicating a vehicle state or a driving state of a prediction target vehicle collected during a predetermined measurement period (S400).

The vehicle trouble prediction system 200 may generate input data corresponding to the collected driving record data (S500). At this point, the data generated by the vehicle trouble prediction system 200 has a format or a form the same as that of the data input into the artificial neural network 60 by the artificial neural network system 100 for the purpose of learning the artificial neural network 60.

Since the process of generating an input data corresponding to the driving record time series data is very similar to the process described with reference to FIGS. 6 and 7, separate descriptions thereof will be omitted.

The vehicle trouble prediction system 200 may determine whether the prediction target vehicle has a trouble on the basis of a prediction value predicted by the artificial neural network 60 from the input data generated from the driving record time series data of the prediction target vehicle (S600).

Meanwhile, the vehicle trouble prediction system 200 may transmit a prediction result to a user terminal of the prediction target vehicle.

Figure 9:
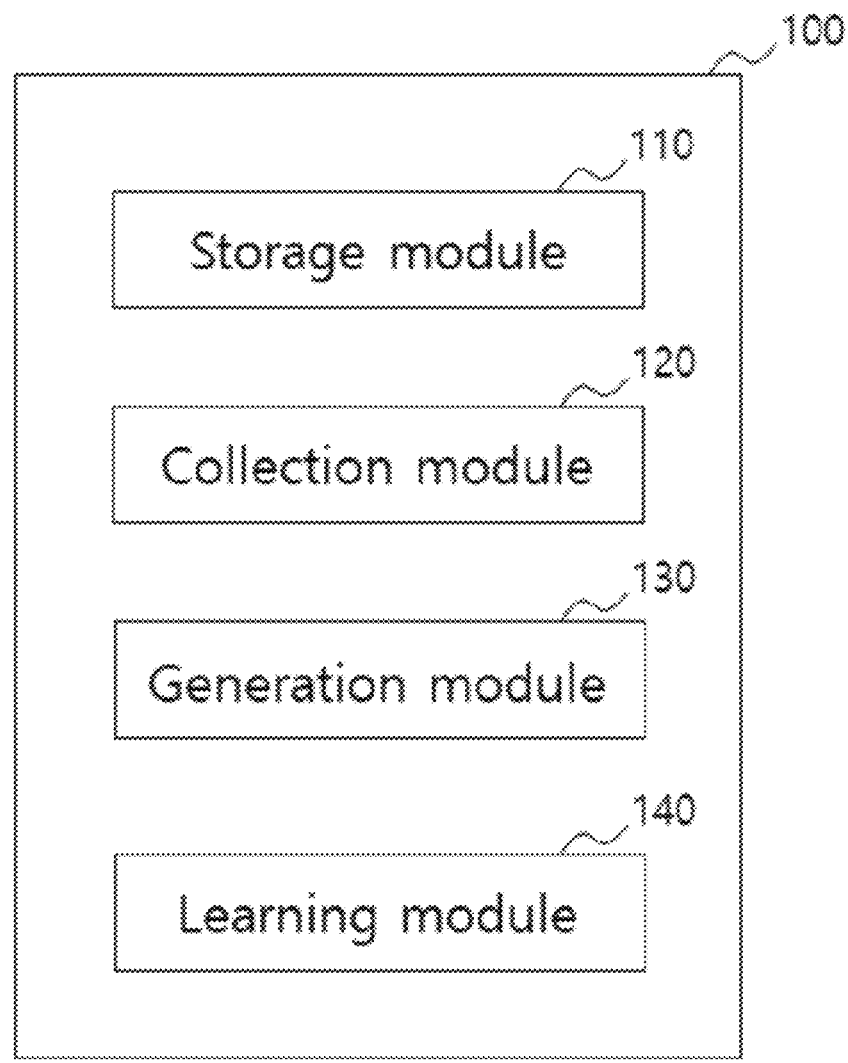
FIG. 9 is a view showing a schematic configuration of an artificial neural network learning system according to an embodiment of the present invention.
Figure 10:
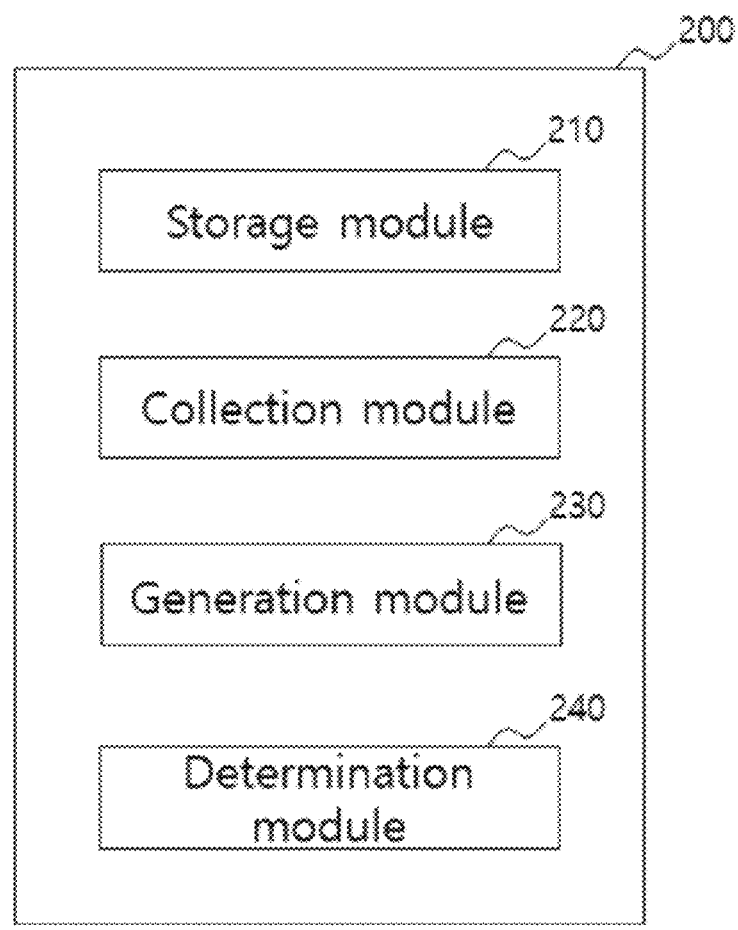
FIG. 10 is a view showing a schematic configuration of a vehicle trouble prediction system according to an embodiment of the present invention.

FIG. 9 is a view showing a schematic configuration of an artificial neural network learning system 100 according to an embodiment of the present invention, and FIG. 10 is a view showing a schematic configuration of a vehicle trouble prediction system 200 according to an embodiment of the present invention.

The artificial neural network learning system 100 and the vehicle trouble prediction system 200 may mean a logical configuration provided with hardware resources and/or software needed to implement the spirit of the present invention, and does not necessarily mean a physical component or a device. That is, the artificial neural network learning system 100 and the vehicle trouble prediction system 200 may mean a logical combination of hardware and/or software provided to implement the spirit of the present invention, and may be implemented as a set of logical components if needed by being installed in the devices separated from each other and performing their functions to implement the spirit of the present invention. In addition, the artificial neural network learning system 100 and the vehicle trouble prediction system 200 may mean a set of components separately implemented for each function or role for implementing the spirit of the present invention. For example, each configuration of the artificial neural network learning system 100 and the vehicle trouble prediction system 200 may be located in different physical devices, or may be located in the same physical device. In addition, according to implementation examples, combinations of software and/or hardware configuring each configuration of the artificial neural network learning system 100 and the vehicle trouble prediction system 200 may also be located in different physical devices, and components located in different physical devices may be organically combined with each other to implement each of the modules.

In addition, in this specification, a module may mean a functional or structural combination of hardware for performing the spirit of the present invention and software for driving the hardware. For example, those skilled in the art may easily infer that the module may mean a predetermined code and a logical unit of hardware resources for executing the predetermined code, and does not necessarily mean a physically connected code or a single type of hardware.

Referring to FIG. 9, the artificial neural network learning system 100 may include a storage module 110, a collection module 120, a generation module 130, and a learning module 140. According to embodiments of the present invention, some components among the components described above may not necessarily correspond to the components essential to implementation of the present invention, and in addition, it goes without saying that the artificial neural network learning system 100 may include more components according to embodiments. For example, the artificial neural network learning system 100 may further include a communication module (not shown) for communicating with the user terminal 20, and a control module (not shown) for controlling the components and resources of the artificial neural network learning system 100.

The storage module 110 may store the artificial neural network 60 to be learned.

The collection module 120 may collect driving record time series data indicating a vehicle state or a driving state of a collection target vehicle during a predetermined measurement period, and collect diagnostic trouble codes generated while the collection target vehicle travels during the measurement period.

The generation module 130 may generate a learning data set on the basis of the driving record time series data and the diagnostic trouble codes of the collection target vehicle collected during the measurement period.

The learning module 140 may learn the artificial neural network on the basis of the generated learning data set.

Referring to FIG. 11, the vehicle trouble prediction system 200 may include a storage module 210, a collection module 220, a generation module 230, and a determination module 240. According to embodiments of the present invention, some components among the components described above may not necessarily correspond to the components essential to implementation of the present invention, and in addition, it goes without saying that the vehicle trouble prediction system 200 may include more components according to embodiments. For example, the vehicle trouble prediction system 200 may further include a communication module (not shown) for communicating with the user terminal 20, and a control module (not shown) for controlling the components and resources of the vehicle trouble prediction system 200.

The storage module 210 may store the learned artificial neural network 60.

The collection module 220 may collect driving record time series data indicating a vehicle state or a driving state of a prediction target vehicle collected during a predetermined measurement period.

The generation module 230 may generate input data to be input into the artificial neural network 60 on the basis of the driving record time series data of the prediction target vehicle.

The determination module 240 may determine whether the prediction target vehicle has a trouble on the basis of a prediction value predicted by the artificial neural network 60 from the driving record time series data of the prediction target vehicle.

Meanwhile, according to embodiments, the artificial neural network learning system 100 and the vehicle trouble prediction system 200 may include a processor and a memory for storing programs executed by the processor. The processor may include single-core CPUs or multi-core CPUs. The memory may include high-speed random-access memory and may include one or more non-volatile memory devices such as magnetic disk storage devices, flash memory devices, and other non-volatile solid state memory devices. Access to the memory by the processor and other components may be controlled by a memory controller.

Meanwhile, the method according to an embodiment of the present invention may be implemented in the form of a computer-readable program command and stored in a computer-readable recording medium, and control programs and target programs according to an embodiment of the present invention may also be stored in the computer-readable recording medium. The computer-readable recording medium includes all types of recording devices for storing data that can be read by a computer system.

The program commands recorded in the recording medium may be specially designed and configured for the present invention, or may be known to and used by those skilled in the software field.

Examples of the computer-readable recording medium include magnetic media such as hard disks, floppy disks, and magnetic tapes, optical media such as CD-ROMs and DVDs, magneto-optical media such as floptical disks, and hardware devices specially configured to store and execute program commands, such as ROM, RAM, flash memory and the like. In addition, the computer-readable recording medium may be distributed in computer systems connected through a network to store and execute computer-readable codes in a distributed manner.

Examples of program instructions include high-level language codes that can be executed by a device that electronically processes information using an interpreter or the like, e.g., a computer, as well as machine language codes such as those produced by a compiler.

The hardware device described above may be configured to execute as one or more software modules to perform the operation of the present invention, and vice versa.

The above description of the present invention is for illustrative purposes, and those skilled in the art may understand that it is possible to easily transform into other specific forms without changing the spirit or essential features of the present invention. Therefore, it should be understood that the embodiments described above are illustrative and non-limiting in all respects. For example, each component described as a single form may be implemented in a distributed manner, and in the same manner, components described as being distributed may also be implemented in a combined form.

The scope of the present invention is indicated by the claims described below rather than the detailed description, and the meaning and scope of the claims and all changes or modified forms derived from the equivalent concepts thereof should be interpreted as being included in the scope of the present invention.

INDUSTRIAL APPLICABILITY

The present invention may be used in an artificial neural network learning method for predicting whether a vehicle has a trouble, a method of determining whether a vehicle has a trouble, and a computing system for performing the same.

What is claimed is:

1. An artificial neural network learning method comprising the steps of:
   (a) collecting driving record time series data indicating a vehicle state or a driving state of a collection target vehicle during a predetermined measurement period, by a computing system;
   (b) collecting diagnostic trouble codes (DTCs) generated while the collection target vehicle travels during the measurement period, by the computing system;
   (c) generating a learning data set on the basis of the driving record time series data and the diagnostic trouble codes of the collection target vehicle collected during the measurement period, by the computing system; and
   (d) causing an artificial neural network to learn on the basis of the generated learning data set, by the computing system,
   wherein:
   the step of generating the learning data set on the basis of the driving record time series data and the diagnostic trouble code of the collection target vehicle collected during the measurement period by the computing system includes the steps of:
      extracting driving record time series data corresponding to a diagnostic trouble code for learning for each diagnostic trouble code for learning, which is at least a part of the diagnostic trouble code of the collection target vehicle collected during the measurement period, wherein the driving record time series data corresponding to the diagnostic trouble code for learning is a part corresponding to a predetermined period in the past starting from a time point of collecting the diagnostic trouble code for learning among the driving record time series data collected during the measurement period; and
      generating individual learning data to be included in the learning data set using the driving record time series data corresponding to the diagnostic trouble code for learning for each diagnostic trouble code for learning, wherein the individual learning data generated using the driving record time series data corresponding to the diagnostic trouble code for learning is tagged with a trouble label corresponding to the diagnostic trouble code for learning;
   the step of generating individual learning data to be included in the learning data set using the driving record time series data corresponding to the diagnostic trouble code for learning includes the step of generating a time series graph image using the driving record time series data corresponding to the diagnostic trouble code for learning;
   the driving record time series data is configured of time series data of a plurality of individual elements, and the step of generating the time series graph image using the driving record time series data corresponding to the diagnostic trouble code for learning includes the steps of:
      generating a time series graph of a time series data of an individual element, for each of the time series data of the plurality of individual elements configuring the driving record time series data corresponding to the diagnostic trouble code for learning; and
      generating a synthesized data by synthesizing time series graphs of the plurality of individual elements configuring the individual learning data;
   the step of causing the artificial neural network to learn on the basis of the generated learning data set includes the step of causing the artificial neural network to learn by inputting the synthesized data corresponding to each individual learning data included in the learning data set into the artificial neural network; and
   the plurality of individual elements include two or more of speed, revolutions of engine per unit time, degree of stepping the pedal according to acceleration of a driver, opening degree of a throttle valve according to acceleration of the driver, amount of fuel in intake air, tire pressure and temperature, battery voltage, intake air pressure, driving distance, remaining fuel amount, engine temperature, coolant temperature, and angular velocity.

2. The method according to claim 1, wherein the step of generating the learning data set on the basis of the driving record time series data and the diagnostic trouble code of the collection target vehicle collected during the measurement period by the computing system further includes the steps of:
   extracting at least part of non-trouble time series data excluding the driving record time series data respectively corresponding to the diagnostic trouble code for learning from the driving record time series data collected during the measurement period; and
   generating individual learning data to be included in the learning data set using the extracted at least part of non-trouble time series data, wherein
   the individual learning data generated using the extracted at least part of non-trouble time series data is tagged with a non-trouble label.

3. The method according to claim 1, further comprising the step of performing steps (a) to (d) for each of a plurality of vehicles having vehicle characteristics the same as those of the collection target vehicle, wherein the vehicle characteristics are at least one among a vehicle model, a vehicle year, and an engine type.

4. The method according to claim 1, wherein the driving record time series data includes time series data of at least one among speed, revolutions of engine per unit time, degree of stepping the pedal according to acceleration of a driver, opening degree of a throttle valve according to acceleration of the driver, amount of fuel in the air, tire pressure and temperature, battery voltage, intake air pressure, driving distance, remaining fuel amount, engine temperature, coolant temperature, and angular velocity.

5. A method of predicting whether a vehicle has a trouble through the artificial neural network learned by the artificial neural network learning method disclosed in claim 1, the prediction method comprising the steps of:
  collecting driving record time series data indicating a vehicle state or a driving state of a prediction target vehicle collected during the predetermined measurement period, by the a computing system; and
  determining whether the prediction target vehicle has the trouble by the computing system on the basis of a prediction value predicted by the artificial neural network from the driving record time series data of the prediction target vehicle.

6. A computer program installed in an information processing device and stored in a computer-readable recording medium for performing the method of claim 1.

7. A computing system comprising:
  a processor; and
  a memory for storing a computer program, wherein when the computer program is executed by the processor, the computer program controls the computing system to perform the method of claim 1.

8. A vehicle trouble prediction system for predicting whether a vehicle has a trouble through the artificial neural network trained by the artificial neural network learning method disclosed in claim 1, the system comprising:
  a collection module for collecting driving record time series data indicating a vehicle state or a driving state of a prediction target vehicle collected during the predetermined measurement period; and
  a determination module for determining whether the prediction target vehicle has the trouble on the basis of a prediction value predicted by the artificial neural network from the driving record time series data of the prediction target vehicle.

9. An artificial neural network learning system that performs learning of an artificial neural network for predicting whether a vehicle has a trouble, the system comprising:
  a collection module for collecting driving record time series data indicating a vehicle state or a driving state of a collection target vehicle during a predetermined measurement period, and collecting diagnostic trouble codes (DTC) generated while the collection target vehicle travels during the measurement period;
  a generation module for generating a learning data set on the basis of the driving record time series data and the diagnostic trouble codes of the collection target vehicle collected during the measurement period; and
  a learning module for causing the artificial neural network to learn on the basis of the generated learning data set, wherein:
  the generation module extracts a driving record time series data corresponding to a diagnostic trouble code for learning for each diagnostic trouble code for learning, which is at least a part of the diagnostic trouble code of the collection target vehicle collected during the measurement period, and generates individual learning data to be included in the learning data set using the driving record time series data corresponding to the diagnostic trouble code for learning for each diagnostic trouble code for learning, wherein the driving record time series data corresponding to the diagnostic trouble code for learning is a part corresponding to a predetermined period in the past starting from a time point of collecting the diagnostic trouble code for learning among the driving record time series data collected during the measurement period, and the individual learning data generated using the driving record time series data corresponding to the diagnostic trouble code for learning is tagged with a trouble label corresponding to the diagnostic trouble code for learning;
  the generation module generates a time series graph image using the driving record time series data corresponding to the diagnostic trouble code for learning in order to generate individual learning data to be included in the learning data set using the driving record time series data corresponding to the diagnostic trouble code for learning;
  the driving record time series data is configured of time series data of a plurality of individual elements, and the generation module generates a time series graph of a time series data of an individual element, for each of the time series data of the plurality of individual elements configuring the driving record time series data corresponding to the diagnostic trouble code for learning in order to generate the time series graph image using the driving record time series data corresponding to the diagnostic trouble code for learning, wherein the learning module generates a synthesized image by synthesizing time series graphs of the plurality of individual elements configuring the individual learning data for each individual learning data included in the learning data set, and causes the artificial neural network to learn by inputting the generated synthesized image into the artificial neural network; and
  the plurality of individual elements include two or more of speed, revolutions of engine per unit time, degree of stepping the pedal according to acceleration of a driver, opening degree of a throttle valve according to acceleration of the driver, amount of fuel in intake air, tire pressure and temperature, battery voltage, intake air pressure, driving distance, remaining fuel amount, engine temperature, coolant temperature, and angular velocity.

10. The system according to claim 9, wherein the generation module extracts at least part of non-trouble time series data excluding the driving record time series data respectively corresponding to the diagnostic trouble code for learning from the driving record time series data collected during the measurement period, and further generates individual learning data to be included in the learning data set using the extracted at least part of non-trouble time series data, wherein the individual learning data generated using the extracted at least part of non-trouble time series data is tagged with a non-trouble label.

11. The system according to claim 9, wherein the artificial neural network learning system further causes the artificial neural network to learn with driving record time series data collected from each of a plurality of vehicles having vehicle characteristics the same as those of the collection target vehicle, wherein the vehicle characteristics are at least one among a vehicle model, a vehicle year, and an engine type.

* * * * *